Jan. 28, 1964        R. B. EVANS ETAL        3,119,129
    CURVED SANDWICH PANELS, METHOD OF MAKING SAME, AND
              METHOD OF MAKING ARTICLES THEREWITH
Filed May 25, 1959                              7 Sheets-Sheet 1

INVENTORS
Robert B. Evans
Ben S. Gibson
George E. Wroote
BY Harness, Dickey & Pierce
ATTORNEYS

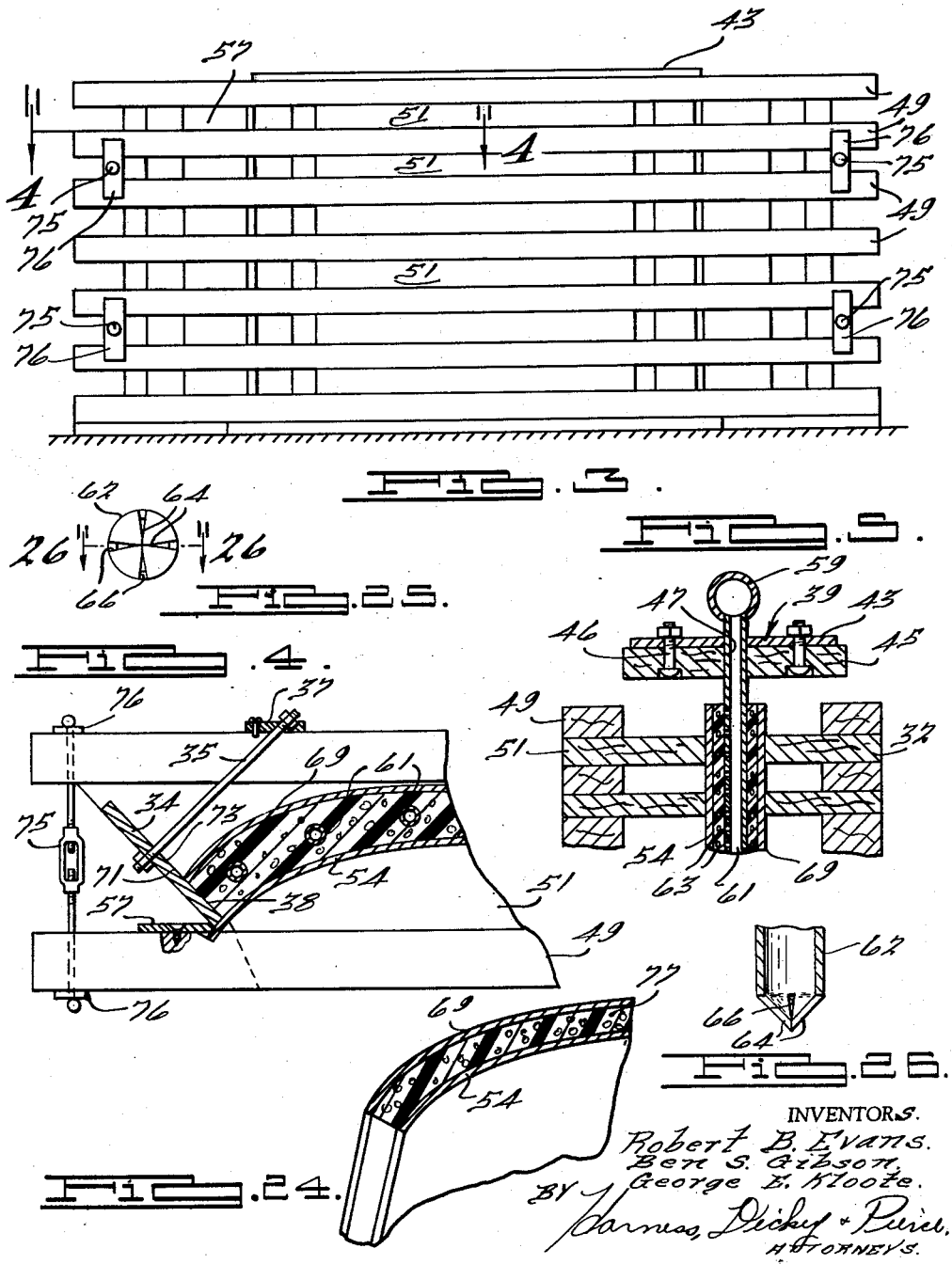

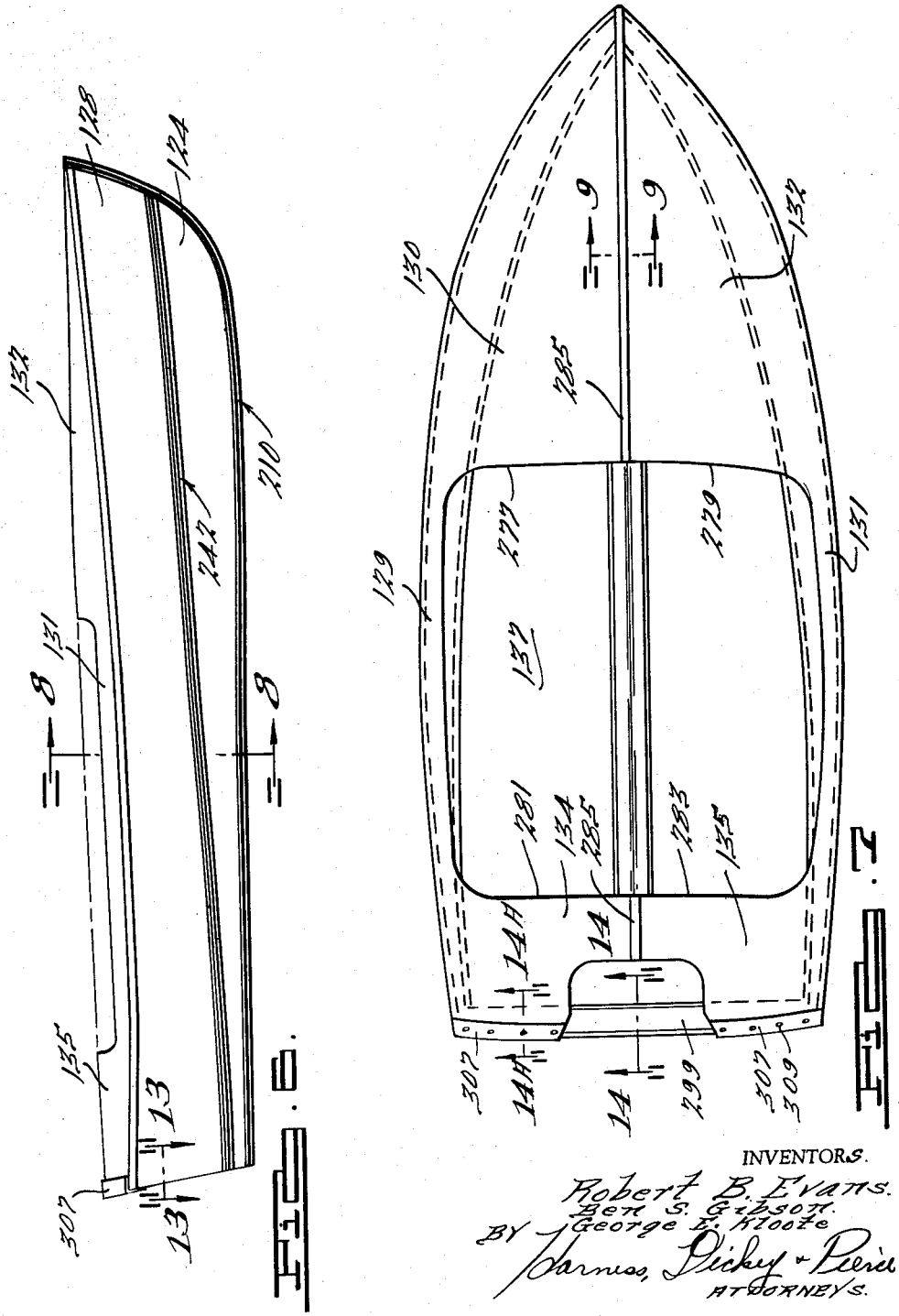

Jan. 28, 1964 R. B. EVANS ETAL 3,119,129
CURVED SANDWICH PANELS, METHOD OF MAKING SAME, AND
METHOD OF MAKING ARTICLES THEREWITH
Filed May 25, 1959 7 Sheets-Sheet 4
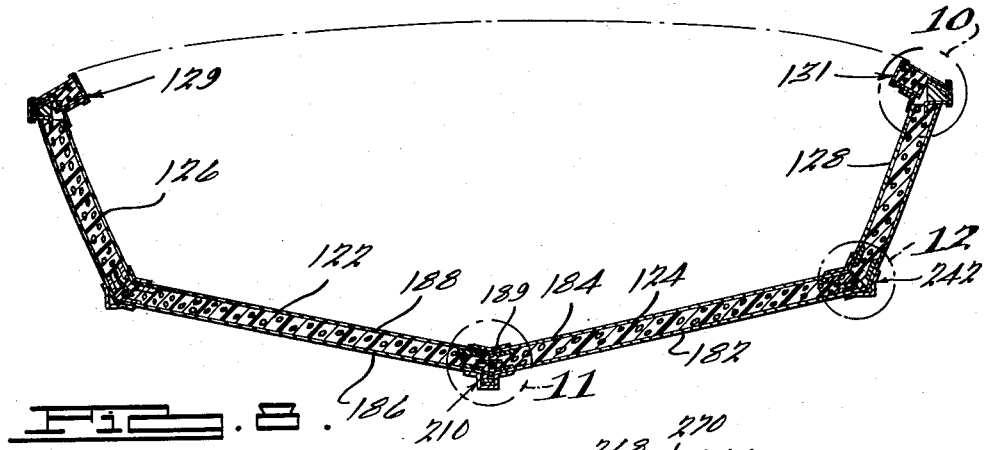
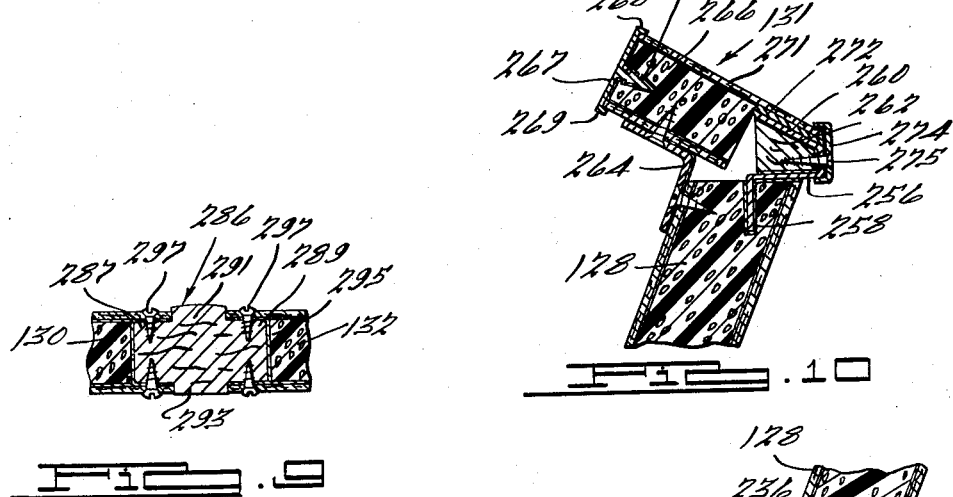
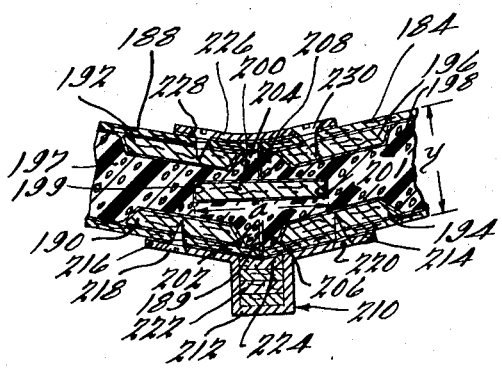
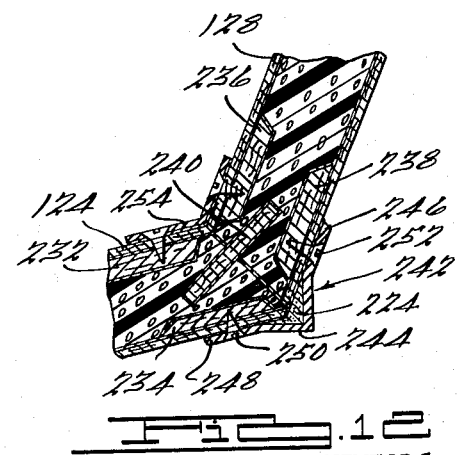
INVENTORS.
Robert B. Evans.
Ben S. Gibson.
BY George E. Klooze.
Harness, Dickey & Pierce
ATTORNEYS.

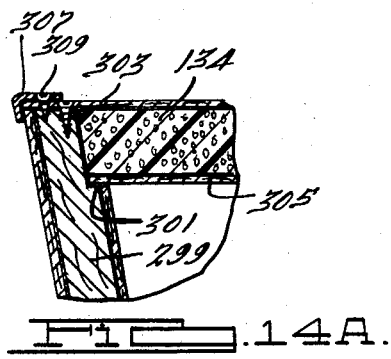
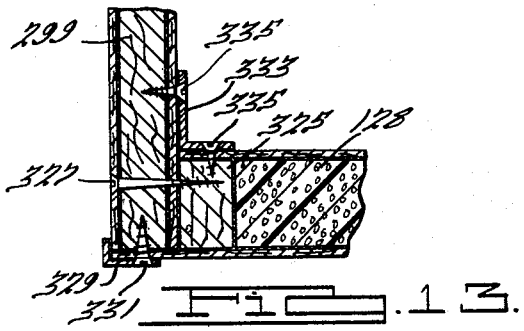
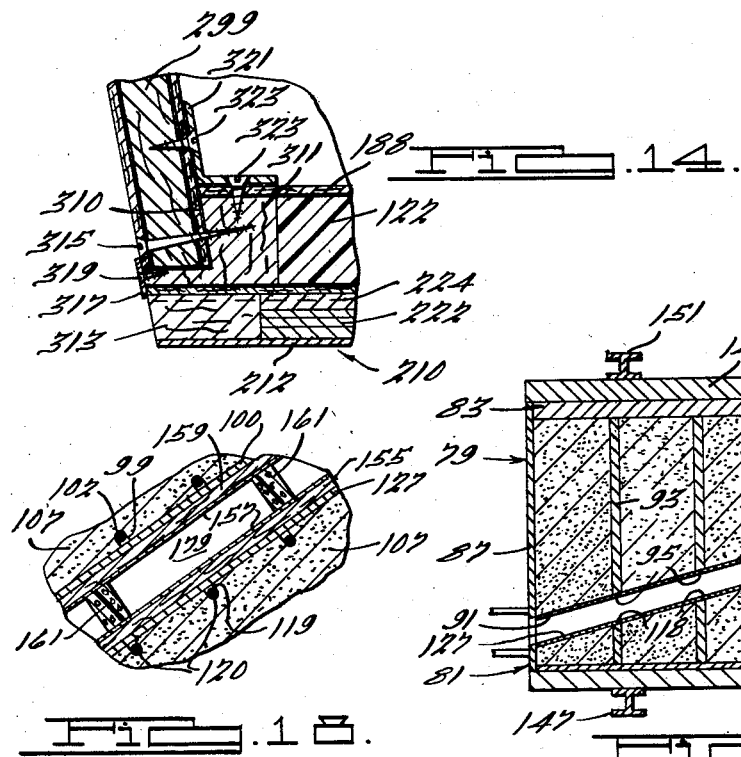

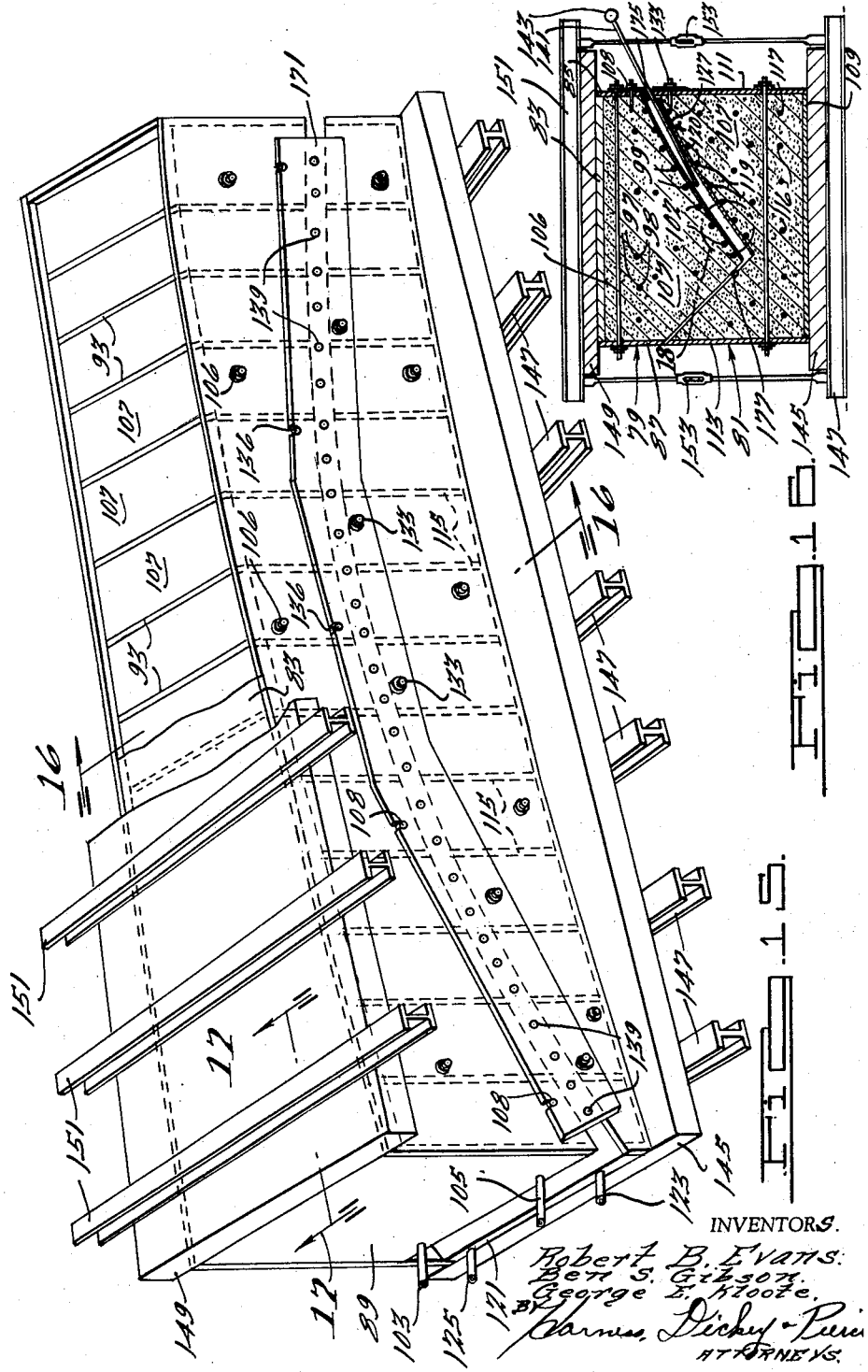

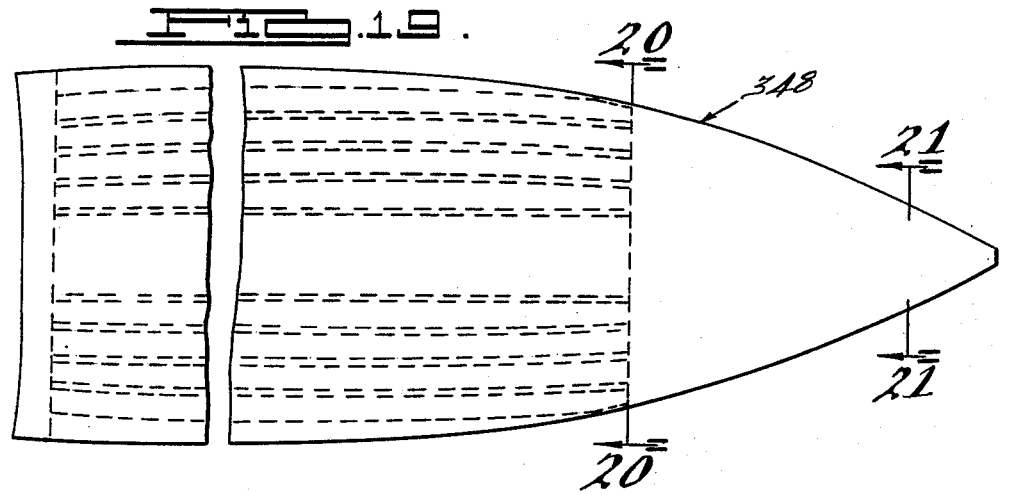
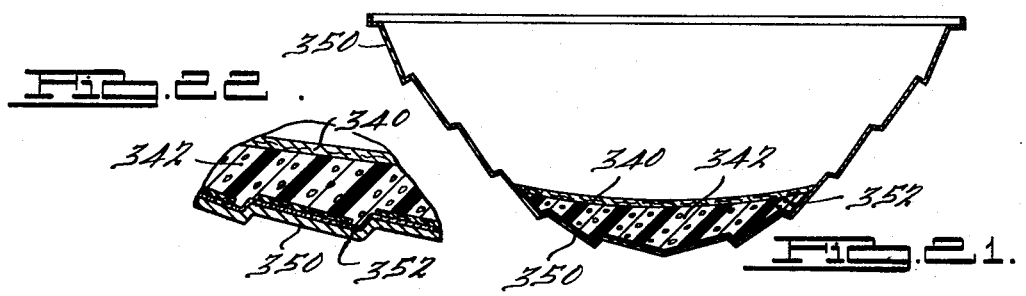
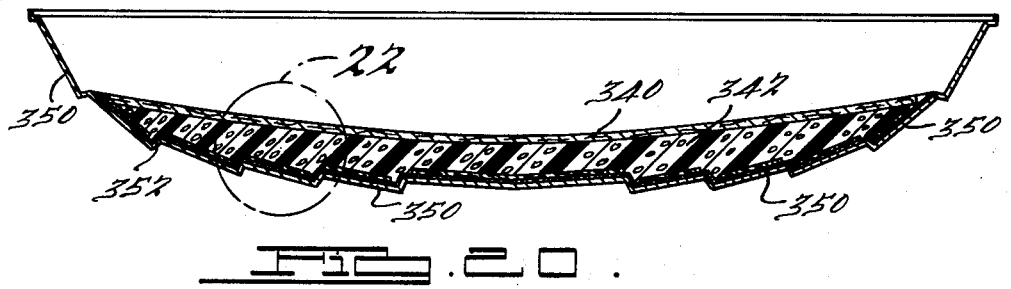
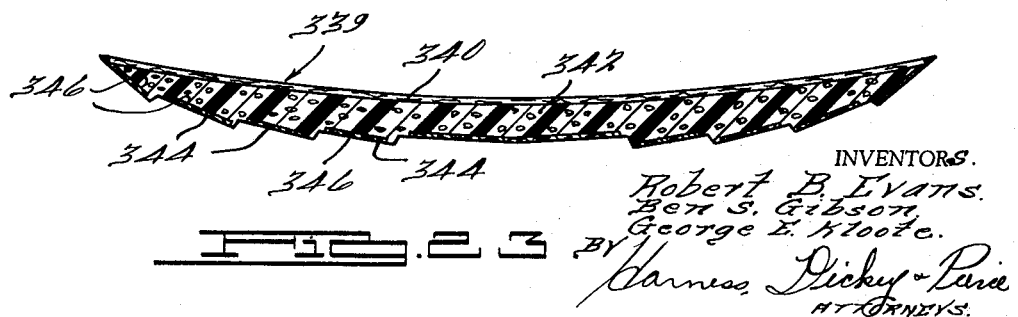

United States Patent Office 3,119,129
Patented Jan. 28, 1964

3,119,129
CURVED SANDWICH PANELS, METHOD OF MAKING SAME, AND METHOD OF MAKING ARTICLES THEREWITH
Robert B. Evans, Grosse Pointe, Ben S. Gibson, Comstock Park, and George E. Kloote, Grand Rapids, Mich., assignors, by mesne assignments, to Evans Products Company, Plymouth Township, Mich., a corporation of Delaware
Filed May 25, 1959, Ser. No. 815,593
12 Claims. (Cl. 9—6)

This invention relates to an improved method for making non-planar sandwich panels, and in its more specific aspects relates to boats fabricated from such sandwich panels and to a method for assembling such panels to make the same.

Sandwich panels comprising a synthetic resinous foamed lightweight core and protective, more dense cover sheets secured to opposite sides of the core are now well known. In all known instances the panels have been flat but complete articles including curved surfaces have been formed, such as radomes and other aircraft parts.

An important object of this invention is to provide an improved method for forming non-planar sandwich panels of a pre-selected contour which permanently retain that contour.

Another object of this invention is to provide an improved method for forming full length boat panels having the desired external contour and a method for assembling such panels into complete boat hulls.

A further object is to provide lightweight insert panels or specially contoured panels comprising a foam core and a cover sheet integrally secured to only one side thereof, with the other side surface of the core having a preselected contour. Such insert panels are of particular utility when adhered to the surface of preformed objects having a contour corresponding to that of the contoured surface of the core such as the internal surface of a boat hull, metal or otherwise.

Another object is to provide a method for constructing boats which eliminates the necessity for conventional hull strengthening members such as interiorly projecting ribs, frames and beams.

A further object is to provide a boat which is lightweight, strong and unsinkable with loads much greater than its normal use load.

Another object of this invention is to provide a simplified and more inexpensive type of boat construction, and a method of making the same which is well adapted to high quantity production techniques.

A still further object of this invention is to provide a boat fabricated from a plurality of performed, pre-shaped panels comprising a foamed synthetic resinous core and cover sheets integrally secured to each side of the core.

Another object is to provide a boat construction which employs inexpensive, readily available materials which are easily assembled by procedures which eliminate much of the heretofore necessary hard work in making boats by conventional means.

Other objects and advantageous features of the invention will appear hereinafter or will become clear upon considering the detailed description of the invention which follows.

In forming planar panels of substantially uniform thickness comprising a synthetic resinous foamed core, and more dense cover sheets adhered to the side surfaces of the foamed core, it is commercially feasible to preliminarily form the core and the cover sheets separately and to thereafter assemble them into panel form with an appropriate adhesive. Where the panel, however, is non-planar in configuration, it is difficult and time consuming to preliminarily prepare a foamed synthetic resinous core to the desired contour with sufficient accuracy to insure easy assembly with mating contoured parts. It may be accomplished by cutting an appropriate shaped core from a larger piece, but this procedure is wasteful of both labor and raw material. Moreover the separate contouring of plywood or other exterior boat surfacing material to be preselected but permanent shape is difficult.

In accordance with the method of forming the non-planar panels of this invention, such non-planar panels are fabricated with a synthetic resinous foamed core and one or more dense cover sheets therefor by the steps of positioning the cover sheets in a mold having a preselected contour, with the outer surface of the cover sheet or sheets being positioned in contact with the adjacent mold surface and expanding a synthetic resin between the cover sheets so that the expanded core is adhered to the inner surface or surfaces thereof. The core may be formed by expanding a foamable resinous material between the cover sheets using any of the many available materials by any of the various techniques of expansion in place. The preferred procedure comprises filling the cavity between the facing sheets with a partially expanded synthetic resinous material in bead form and thereafter effecting consolidation and fusion of the beads at their points of contact to fill the space between the cover sheets and unite the expanded foam to the interior surfaces of the cover sheet to thus form a unitary composite panel. The cover sheets which are suitable for this use may be any of a variety of materials such as metal, plywood, dense synthetic resinous sheet, reinforced or not reinforced, but any cover sheet material possessed of the necessary resistance to penetration, impact, and deflection also possesses the characteristic of inherent resiliency. When, therefore, a flat sheet of any such material is employed as the cover sheet for one of the non-planar panels of this invention, the tendency of the cover sheet is to resume its initial planar condition, and in accordance with this invention it has been found that the quantity of expandable beads of synthetic resinous material which are employed and the tensile strength of the foamed material, from particle to particle, must be sufficient to resist the forces within the cover sheets tending to restore the initial planar condition so that the resulting non-planar sandwich permanently retains the curvature of the mold. Additionally, the quantity of expansible beads which are employed must be sufficient and the conditions of expansion so controlled that the pressures resulting from the expansion of the beads is sufficient to force the planar cover sheets into intimate contact with the inner surfaces of the mold, this pressure contributing both to the soundness of the joint between the synthetic resinous foam and the cover sheet as well as the uniformity of curvature of the resulting panel. It will be apparent that as the thickness and the resistance to bending of the cover sheet increases that the required pressure exerted by the expanding beads must necessarily increase.

The partially expanded synthetic resinous beads which are above referred to as the core-forming material are thermoplastic resinous materials containing organic liquid raising agents in an incompletely foamed-up condition. Suitable resins for this purpose include polystyrene, polyvinyl chloride, polyvinylidene chloride, polyacrylic esters, polymethacrylic esters, polyacrylonitrile, styrene-butadiene interpolymers, etc., and of this group polystyrene represents a preferred material. The organic raising agent can be a low boiling hydrocarbon having a boiling point in the range of about 85° F. to about 160° F., such as pentane, hexane, heptane, petroleum ether, cyclopentane, cyclohexane, etc., and the resin beads will be satisfactory in expansion characteristics when the hydrocarbon represents about 5% to about 20% by weight of the resin.

The initial partially expanded beads have a size in the range of about ½ to about 5 mm. in diameter, and require a preliminary pre-expanding before they can be satisfactorily used in the method of this invention. The beads are pre-expanded to the approximate desired density of ½ lb. to about 10 lbs. per cu. ft. and preferably about 1 to 2 lbs./cu. ft., in a drum-type pre-expander having suitable bead agitation means and a source of steam controllable in quantity and heat content to produce the desired density. After pre-expanding the beads are blown by air into a storage container and aged for a minimum of about 16 hours before they are used in making the panels of this invention. After aging the beads are ready for use.

It has been found that this method is capable of providing non-planar panels which are suitable for assembly into complete articles such as swimming pools, vehicle bodies, aircraft structures, etc. Boats fabricated from a plurality of such panels including a pair of bottom panels and a pair of side panels, together with a transom, when those panels are united along the keel line and the chine lines, have sufficient strength and rigidity to completely eliminate the necessity for the presence of conventional internal strengthening members such as ribs, frames or beams. Moreover, boats fabricated from such panels exhibit excellent buoyancy characteristics and because of the presence of the foamed synthetic resinous core are substantially unsinkable even when loaded with weights greatly in excess of the normal loading in conventional use.

The method of forming non-planar panels will be better understood when considered in connection with the accompanying drawings which show illustrative molding apparatus, and in which:

FIGURE 3 is an elevation view of the mold illustrated in FIGURE 2 with the steam probes and header therefor removed;

FIGURE 4 is an enlarged view of the mold illustrated in FIGURE 3 and taken along the line 4—4 thereof;

FIGURE 5 is a sectional view of the mold illustrated in FIGURE 2 taken along the line 5—5 thereof and looking in the direction of the arrows;

FIGURE 24 is a perspective view of a portion of a typical panel of the type which is made using the mold of FIGURES 1–5;

FIGURE 25 is a bottom end view of a modified form of steam probe; and

FIGURE 26 is a sectional view of the probe shown in FIGURE 25 and taken along the line 26—26 thereof.

Figure 1:
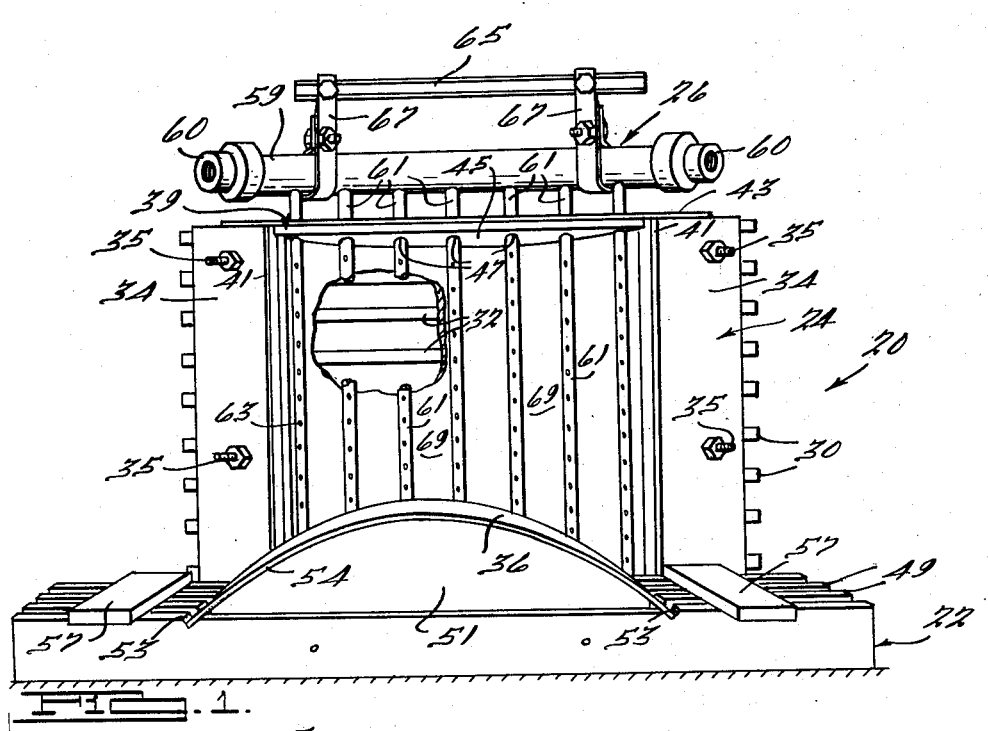
FIGURE 1 is an elevation view, partly broken away, of a mold suitable for forming the non-planar panels of this invention and showing the mold in disassembled form.
Figure 2:
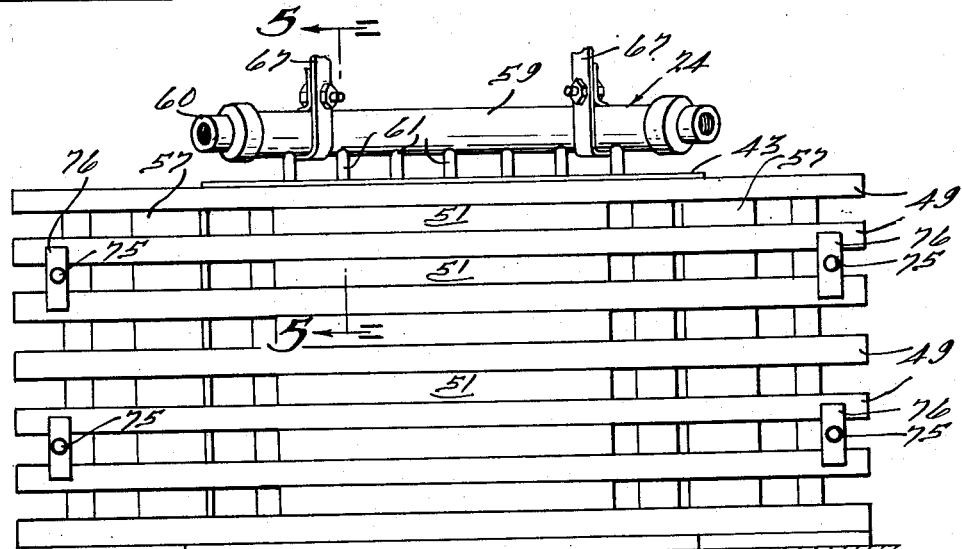
FIGURE 2 is an elevation view of the mold illustrated in FIGURE 1 showing the mold in assembled form.

As may be seen in FIGURES 1 and 2, the mold generally designated 20 is one intended to form a panel having a contour corresponding to that designated 36 on the male portion 22 of the mold and of the type illustrated in FIG. 6. The mold 20 is comprised of a female member generally designated 24, a male portion generally designated 22, and removable probe member generally designated 26. Female member 24 is comprised of a plurality of spaced template members 30, the central portions 32 of which have been contoured so as to collectively define a concavity which complements the contour 36 on male mold member 22. Near each end of each of the members 30, the upper surface thereof has been tapered, as may be seen in FIG. 4 to form a plane substantially perpendicular to the end extension of the arc of portions 32. Each tapered surface collectively defined by members 30 is overlaid with a header plate 34 which is suitably secured thereto by a plurality of bolts 35 which extend through transversely disposed plates 37 which are secured to the lower surface of members 30 by nails or the like. The upper end portions 38 of plates 34 form an end closure surface for the resulting panels. The end portions of the concavity defined by portions 32 of members 30 are closed by end plates 39, at least one of which is removable. The upper surface of plates 39 is flat and bridges the space between the inner surfaces 41 of header plates 34, while the lower surface is curved to coincide with the concave surface defined by portions 32 of templates 30. The plates 39, as shown in FIG. 5 are fabricated with an outer metal surface sheet 43 and an inner wooden sheet 45 secured by suitable means such as bolts 46. One of the plates 39, shown as the upper plate in FIG. 1, is provided with a plurality of apertures 47 adapted to receive steam probes, as will be explained more fully below.

Male mold member 22 is comprised of a plurality of longitudinal members 49 disposed in spaced parallel arrangement and interfitted in their median portions with a plurality of convex templates 51 which are secured to and between members 49 and thus serve as spacers as well as templates. Members 49 are each provided with notches 53 which are positioned adjacent to the end extremities of templates 51 and located so as to receive the ends of a plywood sheet 54 lying in contact with the surfaces of templates 51 when positionable wedge members 57 are moved inwardly, as viewed in FIGURE 1, into contact with the surface of sheet 54 to force the end into notch 53. By this means the plywood sheet 54 is firmly held in place prior to mold assembly and during the formation of foam core 77.

Removable probe member 26 consists of a header pipe 59, having conventional connectors, 60 on each end, which is provided with a plurality of probes 61 spaced along its length. Each probe is an elongated pipe, the interior of which communicates with the interior of header pipe 59, and the surface of which is provided with a plurality of small apertures or jets 63. Jets 63 are aligned on any particular probe but it is to be noted that adjacent probes have their jets 63 angularly shifted, preferably about 45° between adjacent probes, for the purpose of getting good distribution of the dispensed fluid, which in this case is steam or steam and air, throughout the adjacent space. In lieu of a plurality of peripherally positioned jets 63 the probe may be provided with apertures located only in its discharge end. This construction is illustrated in FIGURES 25 and 26 wherein the probe 62 is provided with a plurality of apertures 64 spaced about the end surface of the probe and, as shown, there are four apertures 64 spaced 90° apart, but a smaller or larger number of apertures could be used. The apertures 64, as shown, are triangular in shape and the sides thereof taper inwardly from the base 66 of the triangle to the apex which is located at or immediately adjacent to the inner end extremity of the probe. In a typical commercial probe the width of the base 66 may be about 1/64" to about 1/32" and the height of the aperture 64 may be about 1/8" to about 1/4". Header pipe 59 is provided with a lift member 65 which is secured thereto by straps 67 and which functions to enable the desired positioning of probe member 26 into and out of the mold 20.

In forming a panel in mold 20, the first step is the positioning of a cover sheet 69, for example, plywood, against the upper surface portions 32 of templates 30 with the ends 71 thereof in direct contact with the inner surfaces 73 of header plates 34, FIGURE 4. Such a cover sheet is shown in position in FIG. 1. An adhesive is then spread over the inner surface of that panel. Male member 22 with plywood sheet 54 secured thereon, the inner surface of sheet 54 being coated with an adhesive, is then positioned in face to face relationship and securely clamped thereto, such as by the use of a plurality of clamps 75 seated on caul plates 76, with female mold member 24 to thus form the assembled mold as shown in FIG. 2. Removable probe member 26 and end plate 39 are removed, FIG. 3, if they were in place when member 22 was positioned against member 24, and the cavity between plywood sheets 54, 69 is filled with the above described partially expanded thermoplastic resin in bead form, preferably by blowing the same into the cavity until it is completely filled. End plate 39 is then replaced, probe member 26 is inserted and steam is fed into the bead filled cavity to cause the beads to attempt to expand and thus exert pressure on the surfaces of plywood sheets and to weld or fuse at their points of contact to form an expanded core 77 which is integrally adhered to sheets 54, 69 to thus form an integral panel unit. Upon releasing clamps 75 and removing male member 22 the panel illustrated in FIG. 24 is removable from the mold. The panel comprises outer sheet 69, inner sheet 54 and foamed core 77 integrally bonding the sheets together. When one or more of the cover sheets 54, 69 is plywood, the outer surface of the plywood which forms the exterior surface of the panel can be finished in accordance with conventional finishing procedures for marine plywood or alternatively, the outer surface of the plywood can be covered with a synthetic resinous sheet of a varity of types. The sheet may be a sheet or film of a vinyl resin, polystyrene, or a polyester and may include conventional fillers or reinforcing members such as glass fiber or fabric, metal filaments, etc. One type of reinforced sheet which is unusually suitable for this purpose is a polymerized polyester resinous sheet reinforced with glass fibers. The glass fibers employed can be oriented, as in the form generally referred to as "mats," but for the greatest tensile strength of the facing sheet and resistance to penetration as well as ease of handling during the production of it the glass filaments are preferably in one of the forms generally referred to as "woven fabric" or "woven roving" which are formed by weaving strands of glass filaments into a fabric. Fabrics are available such that a facing sheet prepared using a single ply of the fabric can have a thickness of from about 0.015 inch to about 0.035 inch. For panels requiring greater resistance to penetration, the outer plastic sheet can be made thicker and stronger by using a plurality of plys of woven glass fabrics or a combination of glass mat and fabric. Such sheets can be formed by drawing a sheet of the fabric continuously through an impregnating bath of the partially polymerized resin containing a catalyst and a copolymerizable agent, such as styrene and then through a heated zone to polymerize and set the polyester composition. The sheet is then cut into suitable lengths for application to the plywood panels by the use of a suitable adhesive. Generally speaking, excellent resistance to impact and penetration is obtained in the polyester sheet when the sheet contains from about 35% to about 60% by weight, and preferably between about 40% and about 50% by weight of glass fibers, based on the weight of the total sheet.

For this purpose the polyester resinous composition can be any of the commercially available polyester resins which are now well known and recommended for laminating purposes. These resins are characteristically made by esterifying and olefinically unsaturated dicarboxylic acid, such as maleic acid, itaconic acid and citraconic acid, as well as mixtures thereof, with one another or with a considerable portion of a functionally saturated dicarboxylic acid, such as phthalic acid, tetrachlorophthalic acid, adipic acid and the like, with a polyhydric alcohol. The polyhydric alcohols which are generally employed include ethylene glycol, propylene glycol, butylene glycol, polyethylene glycol, polypropylene glyco, monoesters and monoethers of glycerol and the like. Esterification is carried on until a predominantly linear polymer of suitable viscosity and average molecular weight is obtained.

The predominantly linear polyester thus obtained contains polymerizably reactive ethylenic saturation which, by copolymerization with a polymerizable olefinically reactive monomer, leads to the formation of cross-linked thermoset resins at low temperatures without the use of any appreciable pressure. Suitable olefinically reactive monomers include styrene, the halostyrenes, the methylstyrenes, isopropenyl toluene, vinyl naphthalene, acrylonitrile, methyl acrylate, and others. This cross-linking polymerization is normally carried out with the aid of a peroxide type catalyst.

In order to obtain the maximum strength from the panels of this invention, it is important to obtain a good bond between the inner surface of the facing sheet and the expanding polystyrene beads which form the line of contact therewith. As above generally indicated, the inner surface of the cover sheet, usually plywood, is covered with a suitable adhesive to insure this unitary bond. A number of suitable adhesives are available and can be employed for this purpose. Examples of such adhesives include those referred to as rubber cement, protein latex, albumin, phenoaldehyde adhesives and the like, as well as those containing a polyester resinous substance or an epoxy resinous substance as a base. Inasmuch as the preferred type of panel which is useful for the purposes of this invention involves the use of a wood cover sheet which is absorptive by nature, it is possible to use adhesives which contain water or which evolve a certain amount of water during their own hardening or setting. It is preferable, however, to employ adhesives which do not evolve any sizable quantity of water during the setting process and thus the amine-hardened epoxy resinous adhesives are especially suitable, as well as the class of adhesives generally denominated pressure-sensitive adhesives. For this purpose rubber base pressure-sensitive adhesives are especially satisfactory, particularly those types made from butadiene-styrene types of synthetic rubber. It is possible, however, to use other types of pressure-sensitive adhesives, such as those made from polyvinyl chloride for example. In connection with using a pressure-sensitive adhesive, care should be taken not to employ a solvent-dispersed pressure-sensitive adhesive in which the solvent is a ketone or other solvent having high solvent power which is capable of dissolving to any extent the thin walls of the cells of the polystyrene foam which approach the inner surface of the facing sheet since any such dissolving greatly reduces the over-all strength of the resulting panel. For this reason water-dispersed, rubber base, pressure-sensitive adhesives are preferred. A specific example of a rubber-based pressure-sensitive adhesive which has been found to be suitable for the purposes of this invention is the adhesive available to the trade under the designation R575T from B. F. Goodrich Company. Epoxy resinous compositions which are suitable for this purpose are the liquid partially polymerized, high molecular, weight reaction products of a diphenol and an epoxy compound. A typical example of such a hardenable reaction product is that obtained by heating together 2,2'-bis(4-hydroxyphenyl)-propane, and epichlorhydrin in the presence of an alkali, e.g. sodium hydroxide, whereby there is formed a polymeric glycidyl polyether of the phenolic substance having properties and an average molecular weight dependent upon the reaction conditions and the proportions of the reactants employed. The epoxy resinous bonding agents which are useful for coating the inside surface of the cover sheet prior to the expansion of the polystyrene beads of this invention are those which are capable of further polymerization to solid products under the influence of the heat generated during the polystyrene bead expansion and usually under the partial influence of a hardening agent. A suitable hardening agent is an amine, such as, diethanolamine, triethanolamine, triethyleneamine, ethylenediamine, diethylenetriamine, pyridine, piperidine, dicyandiamide, fatty acid salts of amines and others well known in the art. This hardening agent is preferably added only slightly prior to the time that the epoxy resinous composition is placed on the cover sheet interior surface. The expanding beads which approach this incompletely cured and hardening resinous epoxy layer become intimately bound therewith and as the resinous layer hardens or sets the entire panel becomes one integral unit having maximum strength characteristics.

Curved sandwich panels of extremely large size and having complicated, pre-determined compound curvatures can be formed using the basic steps described above, but as the length and breadth of the panels increases it becomes increasingly difficult to obtain uniform expansion, and fusion of the beads to form a core which has good adhesion to the cover sheets, uniform pore size and freedom from fissures or areas of low bond strength. The method improvements required to overcome these difficulties will be described in detail in connection with the description of the manufacture of a boat fabricated from a plurality of the pre-formed panels of this invention. This method will be described in conjunction with FIGURE 6 through FIG. 17.

FIG. 6 is a side elevation of a boat fabricated by the use of the methods of this invention;

FIG. 7 is a top plan view of the boat illustrated in FIG. 6;

FIG. 8 is a sectional view of the boat illustrated in FIG. 6 taken along the line 8—8 thereof;

FIG. 9 is a partial sectional view of the intersection of the front deck panels taken on the line 9—9 of FIG. 7;

FIG. 10 is an enlarged sectional view of the portion of FIG. 8 encircled by circle 10;

FIG. 11 is an enlarged sectional view of the portion of FIG. 8 encircled by circle 11;

FIG. 12 is an enlarged sectional view of the portion of FIG. 8 encircled by circle 12;

FIG. 13 is an enlarged sectional view of the transom detail taken on the line 13—13 of FIG. 6 and looking in the direction of the arrows;

FIG. 14 is an enlarged sectional view of other transom details taken on the line 14—14 of FIG. 7 and looking in the direction of the arrows;

FIGURE 14A is an enlarged sectional view of the upper end portion of the transom and is taken on the line 14A—14A of FIGURE 7 looking in the direction of the arrows;

FIG. 15 is an isometric view of a typical forming tray suitable for forming a curved sandwich panel having the length and compound curvature necessary to enable its use as a full length panel in the fabrication of the boat illustrated in FIGS. 6 and 7;

FIG. 16 is a cross sectional view of the forming tray illustrated in FIG. 15 on the line 16—16 thereof;

FIG. 17 is a sectional view of the forming tray illustrated in FIG. 15 on the line 17—17 thereof; and FIG. 18 is an enlarged sectional view of the portion of FIG. 16 enclosed by circle 18.

The boat shown in FIGS. 6–14 basically comprises a pair of bottom panels 122, 124, a pair of side panels 126, 128 and a transom 299 and optionally may include a pair of deck panels 130, 132. The bottom panels 122, 124 may be a single flat or curved panel, if desired. Deck panels 130, 132 may include integral or separately fabricated side portions 129, 131 which terminate at their rearward extremities in rear deck panel portions 134 and 135, respectively, to thus define a cockpit 137. All of the panels are sandwich panels of the above described type and the fabrication of right hand side panel 128 will now be described. Panel 128 is formed in a mold of the type illustrated in FIGS. 15–17. The mold comprises an upper portion and a lower portion generally designated 79 and 81 respectively. Upper mold portion 79 consists of a top plate 83, a front plate 85, a rear plate 87 and a pair of end plates 89, all of which may be satisfactorily made of metal, plastic or preferably of plywood. The contoured mold surface 91 is defined by a plurality of spaced templates 93, the inner edges 95 of which are contoured to define one surface of the panel to be formed. Templates 93 are provided with a plurality of apertures 97 which are spaced thereover and which accommodate a plurality of longitudinally disposed reinforcing rods 98. Each of the templates 93 is also provided with a plurality of apertures 99 which lie in the inner surface, which as shown is covered by a thin layer of sheet metal 100, and these apertures accommodate cooling coils 102. Coils 102 are in the form of a continuous pipe with U-shaped bends at the end extremities and the ends of which extend outwardly through end plate 89 and terminate in a feed connection 103 and an exit connection 105. The apertures 99 are preferably formed in the inner surface of the templates 93 in the form of U-shaped slots so that cooling coils may be easily positioned in the templates so as to lie in direct contact at the inner surface of metal mold surface plate 100. The contour of the surfaces 95 of the templates 93 is predetermined from form lines which represent the desired panel contour and each of the templates 93 is spaced a short distance from the immediately adjacent template so that they collectively form a support for mold surface plate 100. A number of transversely disposed reinforcing rods 106 are positioned between templates 93 at spaced locations along the length of the mold and these rods extend through front and rear plates 85, 87 and may be used as attachment means for raising and lowering the mold half into and out of its cavity forming position. The front plate 85 is also provided with a plurality of locating pins 108, which extend through plate 85 and a short distance into material 107. These pins serve to accurately position upper portion 79 on lower portion 81. The templates 93 are secured in place to top plate 83, front plate 85 and rear plate 87 by suitable means so as to occupy the locations shown in FIGURE 15. With the upper mold portion 79 in an inverted position relative to that shown in FIGURE 15, the space between templates 93 is filled with a strength contributing solid material 107, in a castable condition, such as plaster of Paris, cement, concrete, rigid plastic foams or the like. The upper surface of the material 107 is smoothed out so as to conform to the curvature defined by the surfaces 95 of templates 93 and thereafter metal plate 100 is positioned over the contoured surface and cured in place with material 107.

Lower mold portion 81 consists of a bottom plate 109, a front plate 111 and a rear plate 113. In a similar fashion to that explained above, the desired contour is established by positioning a plurality of templates 115, in spaced apart relationship, to the bottom, front and rear plates. Templates 115 are provided with receiving apertures 116 having longitudinally disposed reinforcing rods 117 positioned therein and distributed over the surface of the templates 93. The inner surfaces 118 of templates 115 are provided with a plurality of U-shaped apertures 119 which receive and support cooling coils 120, of the type described above for upper portion 79, and the ends of which extend outwardly through end plate 121 and terminate in a feed connection 123 and an exit connection 125. With the templates 115 in place the space between them is filled with material 107 and the inner mold surface is thereafter covered with a sheet metal plate 127. Front plate 111, as may be seen in FIGURE 16, extends above the mold surface 127 to form a front enclosure surface to complete the mold cavity 179 when upper portion 79 is positioned over lower mold portion 81. A front closure plate 171 is secured to front plate 111 by a plurality of bolts 133 and extends above the upper surface of front plate 111. Plate 171 is provided with a plurality of receiving apertures 136 in its upper surface which are spaced to correspond to the spacing of locating pins 108 on upper mold portion 79 and serve to support upper mold portion 79 as it is lowered into position over lower mold portion 81. A longitudinally disposed sealing gasket 175 is positioned adjacent to the top surface of front plate 111 and a second longitudinally disposed gasket 177 is positioned on the rearward portion of lower mold 81 and these gaskets effect a pressure-tight seal between the upper portion 79 and lower portion 81 as the locating pins 108 of upper portion 79 move into receiving slots 136 in closure plate 171. Closure plate 171 is provided with a second plurality of apertures 139 which are adapted to receive steam probes 141 which, as shown, are attached to a steam feeding header pipe 143.

The assembled mold, ready for panel formation, is formed by positioning lower mold portion 81 on caul plate 145, supported on a plurality of spaced apart I-beams 147. The lower mold surface 127 is then covered with a sheet of plywood 155, the upper surface of which is coated with a coating of one of the typical adhesives 157 described above. A plurality of prefoamed spacer blocks 161, preferably of the same composition of the beads to be employed and having the approximate desired core thickness are positioned on the adhesive on sheet 155 and spaced over the surface. A second plywood sheet 159, having one of its surfaces coated with a similar adhesive 157 is placed over the spacer blocks with the adhesive layer in contact therewith. The upper mold portion 79 is then placed into position over sheet 159 and covered with an upper caul plate 149, and caul plate 149 is overlaid with a plurality of upper I-beams 151. The protruding ends of I-beams 147, 151 are then clamped together with a plurality of clamps 153, as may be seen in FIGURE 16. The mold is then filled with a quantity of pre-expanded polystyrene beads by injecting the same through apertures 139, preferably through a nozzle using air as the propelling means. A sufficient quantity of beads is injected to substantially completely fill the cavity 179. Due to the compound curvature and the length of the cavity 179, and the difficulty of sealing steam probes 141 in apertures 139 to prevent the escape of steam as pressure increases during the bead expansion, it has been found to be desirable to introduce steam into the pre-expanded beads in only a few of the probe apertures at any one time. A preferred method comprises introducing a plurality of probes in, for example, four of the apertures 139 at the lefthand end of the mold, as viewed in FIGURE 15, injecting steam into these apertures until the temperature within the cavity reaches about 275° F.–285° F., withdrawing the probes and immediately inserting the probes in the next adjacent series of apertures 139 to the right of the initially expanded areas of beads, or by using a second set of four probes, if desired.

The steam header pipe operates satisfactorily at a line pressure between about 40 and about 50 lbs./sq. inch and the temperature within the expanding beads may be determined by the use of thermocouples, appropriately positioned, or by observing the rate of buildup of steam back pressure as the beads expand. As the beads expand, the back pressure slowly increases until it reaches the range of approximately 20 to 30 lbs./sq. inch and maintains this pressure for a short time before the initiation of a relatively rapid increase in pressure, and it has been found that the temperature within the expanding beads is within the range of 275° F.–285° F. when the back pressure momentarily levels off and the initiation of the withdrawal of probes at this time will result in a uniformly expanded and fused core.

It will be apparent that probes 141 occupy space within the expanding beads which would represent voids or discontinuities in the final core unless the beads expanded to fill this space as the probes are withdrawn from the expanded beads. It has been found that the probe space is filled as the probes are withdrawn if the steam pressure is maintained as the probes are withdrawn. If however, the steam is turned off before the withdrawal of the probes is initiated, the final core contains areas which are not uniformly filled with expanded beads. Withdrawal of the steam probes while the steam pressure is maintained thus represents a preferred procedure.

By repeating the probe insertion and removal procedure described, the core is expanded and the individual beads fuse into an integral core which is uniformly bonded to the plywood cover sheets 155, 159. During the application of steam, water is circulated through cooling coils 102 and 120. After the expanded panel has cooled, clamps 153 are released and upper mold portion 79 is removed to expose the formed panel which can then be lifted from the mold surface 127. Although a steam probe header carrying a sufficient number of probes to simultaneously fill all of the apertures 139 is relatively bulky and difficult to handle, it will be appreciated that the shape and probe orientation relative to the header must necessarily vary with the angle of inclination of the cavity 179 as it changes from end to end in the panel, and this angle necessarily varies with the curvature of the particular panel being fabricated. It will also be apparent that differently shaped header and probe assemblies will be required for simultaneously expanding the beads in differently shaped panels and therefore the use of a short section of header pipe carrying a small number of steam probes is advantageous from the standpoint of ease of manipulation. On the other hand the rate of producing curved panels is greatly increased when the header is so shaped that the heads in the entire length of the panel can be expanded at one time. Separate headers having the contour of each of the panels to be formed may be preliminarily fabricated, but a preferred form comprises a composite header carrying a plurality of separately, angularly adjustable probes mounted on support means having power actuated inserting and withdrawing means and this form is adaptable for use in expanding beads to make panels of diverse lengths and contours.

In using composite headers of this type, satisfactory control of the steam application conditions is obtained by the provision of valving controls which enable the selective application of steam to only certain probes, as desired. The probes carried by the composite header are inserted into the cavity containing the beads to be expanded by one motion. As above indicated it is desirable to withdraw the probes with the steam pressure on and with a composite header all probes are preferably withdrawn at the same time. Portions of panels that are not uniform in depth, for a constant thickness, contain less beads to be expanded at the points of less depth than portions of the same panel having a greater depth and less steam is required at these more shallow locations. A satisfactory method of controlling the steam to obtain uniformity of bead expansion along the entire panel length comprises the application of steam to the probes positioned in the shallow portion of the panel prior to application of steam to the probes in the portions of the panel having greater depth. The steam is applied to the portions of greater depth a predetermined time interval thereafter and the entire assembly is withdrawn at a constant rate from the panel. Since the probes being withdrawn from the portions of greater depth require a longer time to achieve separation from the panel, it will be appreciated that the time of effective steam application to both the deep and more shallow portions can be regulated so that a similar quantity of steam, and therefore heat, is injected in each unit of volume of the beads. The regulation requires adjusting the time of application of the steam to the shallow portions prior to application to the deeper portions and, as a general rule, the time should approximately correlate with the time that the probe which is removed from the shallow portion is out of contact with the panel before the probes located in the deeper portions are separated from the panel. While it is difficult to state definite time relationships for panels of various curvatures and configurations, it is relatively easy to employ the above general guide in a few trials with the specific panel to be fabricated to establish optimum operating conditions. It has been found that the use of the steam probe having apertures only in the inner end portion, FIGURES 25 and 26, produces more uniformly expanded cores when using such a composite header to expand all of the beads in an entire curved panel simultaneously, and its use is therefore preferred.

It has also been found to be advantageous to employ dry steam, preferably superheated since excessive entrapped moisture is undesirable in the final foam.

While the expansion and fusion of the partially expanded beads is preferably accomplished by the use of steam, it is also satisfactory and in some cases preferable to effect the expansion and fusion of the beads by using high frequency di-electric heating. Where high frequency di-electric heating is to be used it has also been found to be advantageous to preliminarily contact the partially expanded beads with an aqueous solution containing 1%–5% by weight of a wetting agent such as an alkyl aryl sulfonate available commercially under the designation Duponol PC or Nacconol EP or the like. The cavity is filled with the thus treated beads and subjected to high frequency oscillations of about 13 megacycles and maintained for sufficient time to convert the moisture which is present into steam, usually 3–15 minutes. When this type of heating is employed somewhat greater uniformity of expanded bead size has been observed and the resulting panels exhibit slightly greater resistance against bending and resistance to penetration. Panels produced by this type of heating have also been observed to maintain lesser quantities of retained moisture and to exhibit a higher K factor than panels of comparable thickness formed by the use of steam injected therein by probes.

While the above description is directed to the manufacture of right hand side panel 128, it is to be understood that bottom panels 122, 124 and left hand side panel 126 as well as deck panels 130, 132 are formed by using the same method and substituting molds shaped to provide the necessary contour to permit assembly into a boat having the shape of that illustrated in FIGURES 6 and 7.

*Boat Assembly*

As may best be seen in FIGURES 8 and 11 the bottom section of the boat is formed by first slightly tapering the inner surfaces of right hand panel 124, having outer cover sheet 182 and inner cover sheet 184, and lefthand panel 122, having outer cover sheet 186 and inner cover sheet 188 so that they form a tightly fitting joint or line of juncture 189 when placed in longitudinal abutment. The core of each of panels 122, 124 is then routed out in the area immediately adjacent to the cover sheets and the inner tapered surface of the core to form cavities for receiving filler panels 190, 192, 194 and 196 respectively. The central portion of the core is also removed in the direction inwardly from the tapered inner surface to form cavities 199 and 201 in panels 122, 124 respectively, which cavities jointly are adapted to receive a longitudinally disposed spline 200 which completely occupies the cavities and extends the full length of the panels. Filler panels 190–196 serve to reinforce the inner portions of panels 122, 124 and to receive various securing means and thus they may be fabricated from any material that is rigid and capable of receiving fasteners such as screws, and a preferred material for this purpose is wood, most preferably in the form of plywood. The cavities for receiving filler panels 190–196 and spline 200 are preferably formed slightly under size so as to insure a good fit and adherence to the surfaces of cover sheets 182–188 and the portions of the core 197, 198 which lie immediately adjacent thereto. The fillers 190–196 are coated on all surfaces with one of the above described adhesives, preferably one which sets to full hardness and strength without the application of heat, and in their coated condition are forced into the receiving cavities and allowed to set. Core portions 202, 204, 206 and 208 which lie between the inner edges of fillers 190–196 and the line of juncture 189, having a suitable shape to fill the entire area are coated with an adhesive and adhered in position to make the core complete. With the filler panels 190–196 in place, bottom panels 122, 124 are ready for assembly. The outer surface of spline 200 and the inner surfaces of receiving cavities 199, 201 are each coated with a suitable adhesive. The panels are then united with spline 200 between them. Spline 200 functions to add substantial strength to the panels primarily by virtue of the increase in area of contact between the core portions and additionally by virtue of the inherent strength of the spline per se. It has been found that the successful butt joining of longitudinally disposed panels of the type described herein for use in boats is dependent upon the provision of a spline, and moreover the provision of a spline which has a width dimension $a$ which is controlled relative to the thickness dimension $y$ of the panels being joined. The width dimension $a$ should be at least one-half the thickness dimension $y$ and may practically extend to as much as twice the thickness dimension $y$. For most small boat applications the width dimension $a$ preferably lies within the range of $0.5 \, y$ to $1.5 \, y$.

With panels 122, 124 in abutting relationship, a keel 210 having a hollow U-shaped central portion 212 and a pair of outwardly extending flanges 214, 216 is positioned to overly the line of juncture between the inner edges of cover sheets 182 and 186. Keel 210 is secured to the surfaces of cover sheets 182, 186 by a layer of one of the above described adhesives which is preliminarily spread on the inner surface of flanges 214 and 216 before the keel is brought into engagement with the cover sheets and is additionally secured with a plurality of longitudinally spaced blind screws 218, 220. As may be seen, screws 218, 220 terminate within the filler panels 190, 194 so as to avoid leakage into the core portions 198, 197. The hollow U-shaped portion of keel 210 is reinforced with a plurality of layers of plywood or other rigid solid material 222 and the space between the upper surface of the plywood 222 and the line of juncture of cover sheets 182 and 186 is preferably filled with a non shrinking waterproof caulking material 224. A successful material for this purpose is the caulking composition of U.S. Patent No. 2,610,923, and this material has been found to maintain a water-tight joint which is free of the tendency to corrode the keel 210 which in the embodiments shown is fabricated of aluminum. On the inner surface of cover sheets 184, 188 a metallic angle member 226 overlies the line of juncture of the inner surfaces of panels 184 and 188 and extends the full length of the joint. Angle member 226 is secured to cover sheets 184, 188 by both a layer of adhesive, of the above described type which was preliminarily spread on the mating surfaces of member 226 and the abutting panels and additionally by a plurality of longitudinally spaced blind screws 228, 230. Screws 228 and 230 terminate within filler panels 192, 196 respectively and thus avoid the possibility of providing a pathway for water which may find its way into core 198, 197.

Side panels 126, 128 are joined to the outer ends of bottom panels 122, 124 along the chine lines with a joint generally comparable in components and method of fabrication described in connection with the joint attaching keel 210 to bottom panels 122, 124. In this case, for the joint between panels 124 and 128, as may be seen in FIG. 12, filler panels 232, 234, 236 and 238 and spline 240 are provided and secured in place in a similar fashion. The external joint between panels 124, 128 is overlaid by chine 242, having a central V shaped portion, the lower surface 244 of which is disposed in a substantially horizontal plane when the boat is afloat and a pair of outwardly extending flanges 246 and 248 which are secured to fillers 234, 238 with blind screws 250, 252. The cavity in chine 242 is filled with the water-tight caulking material 224. The same considerations regarding relative dimensions of spline 240 and the thickness of panels 124, 128 apply as were stated for the joint at keel 210. It will be appreciated, however, that as the degree of overlap of chine flanges 246, 248 increases that the relative width of spline 240 can satisfactorily decrease toward the stated minimum of 0.5 y. The inner line of juncture of panels 124, 128 is overlaid with a longitudinally extending angle member 254 which is secured to the cover sheets with longitudially spaced blind screws as before explained.

The joint between the upper extremity of side panels 126, 128 and gunwale cap members 129, 131 is illustrated in FIG. 10. As there shown the upper end of panel 128 is provided with a flange member 256, generally V shaped, having a downwardly disposed leg 258 which extends into the core of panel 128, and the upwardly inclined leg portion 260 of which defines the external contour of member 131. This contour blends uniformly into the line of contour of upper deck panels 130, 132 when they are present. The cavity defined by the V portion of flange member 256 is filled, at intermittent locations with a screw receiving member 262, such as wood, and at other locations with blocks of the foamed core material of suitable shape. The inner surface of panel 128 is provided with an angle member 264 which supports a short section of a panel 266 similar to side panel 128 and terminating at its inner end in a cap member 267. Cap 267, having overlapping, downturned flange portions 268, 269, is adhered to the core of panel 266 with an adhesive applied to its inner surface and to the surface of time portion 270 which is forced into the core. The upper surface sheet 271 of panel 266 extends downwardly and overlies portion 260 of flange 256 and is supported thereon with spacer 272. The extreme outer ends of flange 256 and surface sheet 271 are covered with an encompassing U-shaped flange 274 which is secured to member 262 by screws 275. It is to be understood that flange members 256 cover the outer edge of side panels 126, 128 from the stern to the bow end of the boat, both in the presence of and in the absence of deck panels 130, 132, 134, 135. As shown in FIGS. 6 and 7, front deck panels 130, 132 and rear deck panels 134, 135 are present and the external edges of these panels are attached to the upper edges of side panels 126, 128 by the use of the joint illustrated in FIG. 10. The inner edges 277, 279 of front deck panels 130, 132 respectively, terminate in cap member 267 which extends continuously from the gunwale portions 129, 131. Similarly the inner surfaces 281, 283 of rear deck panels 134, 135 respectively, are covered with the same cap member 267 and are joined with the extension of the cap member 267 which lies in the gunwale sections 129, 131.

Front deck panels 130, 132 and rear deck panels 134, 135 are joined to each other along the central line of juncture 285 with the joint which is shown in detail in FIG. 9. As there seen, the inner edges of the core which lies adjacent to the inner edges of the panels at their line of juncture 285, has been removed to accommodate a sealing member 286. Sealing member 286 is an elongated solid member having a pair of outwardly extending arm members 287, 289 and a pair of vertically disposed members 291, 293, the upper surface of arm 291 of which is crowned and lies slightly above the plane of the upper surfaces of the cover sheets of deck panels 130, 132. Arm portions 287, 289 interfit into the cavities in the core of panels 130, 132 and are secured to the upper and lower cover sheets and the core with a layer of adhesive 295 which covers all contacting surfaces of sealing member 286 as well as a plurality of blind screws 297 which are longitudinally spaced along the line of juncture 285.

Panels 122, 124, 126 and 128 when assembled as above described, define a boat cavity which is open at the rearward end. The rearward opening is closed by a transom panel 299 as may be seen in detail in FIGURES 13, 14 and 14A. Transom panel 299, as shown is fabricated of wood or plywood, preferably plywood, and at its upper end is notched at 301 to receive and support the rearward end portion of rear deck panels 134, 135. The upper cover sheet 303 of rear deck panel 134 extends rearwardly beyond the lower cover sheet 305 and overlies the upper surface of transom panel 299. The line of juncture between the rearward surface of transom panel 299 and upper cover sheet 303 is enclosed by a transversely disposed L-shaped molding 307 which is secured at spaced points to transom 299 by a plurality of screws 309. At its lower end transom panel 299 is seated in a receiving aperture 310 in a wooden plug 311 which is positioned within the end of bottom panels 122, 124 and adhesively secured thereto. The rearward end of keel 210 is fitted with a wooden plug 313 which serves to maintain the caulking material 224 in place and avoids the migration of water into plywood portion 222. Plug 313 is adhesively secured to the inner walls of U-shaped portion 212 of keel 210. The lower end portion of transom 299 is secured to wooden plug 311 at spaced points across the width of transom 299 by a plurality of screws 315. The space between the rearward end extremity of cover sheet 186 and the lower end of transom 299 is covered with a protective cover plate 317, preferably corrosion resistant metal such as aluminum, which is secured in place by suitable fastening means such as screws 319. The inner corner defined by the inner section of upper cover sheet 188 and the inner surface of transom 299 is covered by a transversely extending L-shaped molding 321 which is secured to transom 299 and plug 311 by a plurality of screws 323 which are spaced across the width of the transom.

As may be seen in FIG. 13, the joint between transom 299 and side panel 128 comprises a wooden plug 325 adhesively secured in the rearward end of side panel 128 and to which transom 299 is secured by a plurality of vertically spaced fasteners such as screws 327. The external corner of transom 299 is covered by L-shaped molding 329 which is secured thereto by screws 331. The internal corner is protected by an L-shaped molding 333 which is secured to transom 299 and plug 325 by a plurality of screws 335.

The panels described by using the method of this invention have all included cover sheets on both side surfaces of the foam core. A modification of the method of this invention is illustrated in FIGS. 19–23 inclusive.

The modified process comprises the provision of panels having one adhered cover sheet, and a foamed core, with the exposed surface of the core having a pre-formed contour of the desired shape. Such panels are useful as inserts for ready attachment to pre-formed shells, for example as insert floor panels for pre-formed metal boat hulls.

In these figures:

FIG. 19 is a top plan view of a boat embodying this modified process;

FIG. 20 is a sectional view taken along the line 20—20 of FIG. 19;

FIG. 21 is a sectional view taken along the line 21—21 of FIG. 19;

FIG. 22 is an enlarged sectional view of the portion of FIG. 20 encircled by circle 22; and FIG. 23 is a sectional view of an insert panel which typifies the panels obtained from the practice of the modified process of this invention.

The panel generally designated 339, FIG. 23, comprises an inner cover sheet 340, and a foamed core 342. The exposed surface of core 342 is provided with series of cascading ledges 344, the surfaces of which are reinforced with rigid dense impact resistant reinforcing inserts 346 such as plywood, resin impregnated fiberboard, asbestos, plastic, rubber or the like. While reinforcing inserts 346 add strength and impact resistance, they may be omitted, if desired.

Panel inserts 339 are readily fabricated in a mold of the type illustrated in FIGURE 15 having, for example, one side surface of an upper mold portion which is provided with a surface configuration corresponding to that of the exposed surface of core 342. The lower mold portion surface conforms in contour to that of cover sheet 340. In using such a mold, cover sheet 340 is placed in position on the lower mold surface and thereafter the longitudinally disposed, adhesive coated inserts 346 are supported thereon by spacer blocks comparable to those designated 161, FIG. 18. The upper mold portion is then placed over the lower mold portion to complete the mold cavity. The upper mold portion is coated with a mold release agent, such as a wax or silicone resin, to insure separation of the upper mold surface from the resulting panel. The cavity is filled with partially expanded beads, of the type above described, and these beads are expanded and fused, in accordance with the method steps of this invention, to themselves and adhered to the reinforcing strips 346.

FIGURES 19-22 illustrate a pre-formed metallic boat hull generally designated 348 which has been fitted with the stiffening lightweight panel insert 339. Boat hull 348 is provided with an exterior skin 350 a configuration having a series of step down or cascading ledge portions which collectively form a typical V-shaped boat cavity. Insert panel 339 is shown adhered in place in direct contact with the inner surfaces of the ledges 350 and secured thereto by a layer of adhesive 352 which is preliminarily applied to the exposed surface of insert 339 before the insert is placed in contact with the boat hull ledges 350. Any of the adhesives described above may be used satisfactorily, but a pressure sensitive adhesive or a catalyzed room temperature setting epoxy resin is preferred. As shown in FIGURE 19 the longitudinally disposed reinforcing insert 339 extends only from a point spaced from the bow of the boat 348 rearwardly toward the stern and terminates slightly short of the transom location but the insert may cover the entire floor surface, if desired. Because of the unitary nature of panel inserts 339 and their strength contributing and stiffening ability, it is apparent that a boat can be formed which is free of internal projections and the conventional frames, braces and the like. It is to be further understood that the inner cover sheet 340 may be a single ply or it may be of multiple plys of the same or a different material including metal, higher density foam, solid plastic, etc., where even greater stiffening is needed. It will be readily apparent that the thickness of core 342 can be controlled to provide any desired degree of resistance to sinking upon capsizing. Moreover, the inner surface of cover sheet 340 can be finished with a conventional marine finish or covered with wear resistant partial or complete layers, such as plastic films, rubber coating, reinforced polyester sheets, etc.

What is claimed is:

1. A boat fabricated from a plurality of panels including at least one bottom panel and a pair of side panels, each said bottom and said side panel having a compound curvature, extending the full length of the boat and comprising a synthetic resinous foam core and a cover sheet adhered to each side surface of said core, said side panels secured to each exposed edge of said bottom panel and to each other at the forward end of the boat in water-tight relationship, splines bridging the line of juncture between each said side panel and said bottom panel, said splines being located in the median portion of the cores of said side and bottom panels, adhesively secured thereto, extending substantially the full length of said joint, and having a width dimension in the range of one-half to twice the thickness dimension of said side and said bottom panels, said assembled bottom and side panels defining a boat cavity open at its rearward end, and a rear panel secured to the rearward ends of said side and bottom panels, the cavity defined by said panels being free of inward projections.

2. A boat in accordance with claim 1 wherein the said foamed resinous core is polystyrene and at least one of the said cover sheets is a wood product.

3. A boat in accordance with claim 1 wherein said core is polystyrene, the exterior cover sheet comprises at least one layer of plywood and a glass filament reinforced thermoset polyester resinous sheet adhered to and covering the entire exterior surface of said plywood.

4. A boat in accordance with claim 1 wherein the said foamed resinous core is a light-weight closed cell foam, the internal cover sheet is a wood product, and the exterior cover sheet is metal.

5. A boat fabricated from a plurality of panels including a pair of bottom panels, a pair of side panels and a rear panel, each said panel having a foamed synthetic resinous core and more dense cover sheets adhered to each side surface of said core, said bottom and side panels having a compound curvature and extending the full length of said boat, the said bottom panels being secured together along the keel line, the said side panels being secured to the other edge surface of each said bottom panel at the chine line and to each other at the forward end of the boat, splines bridging the lines of juncture between each said side and said bottom panel at the said chine line, and each of said bottom panels at said keel line, each said spline being located in the median portion of the cores of said panels at said chine and said keel lines, adhesively secured thereto, extending substantially the full length of said joint and having a width dimension in the range of one-half to twice the thickness dimension of said panels, said rear panel being adhered to the rearward ends of said side and said bottom panels, closure members positioned on the upper edge surfaces of said side panels extending for the full length thereof and forming a water-tight seal therewith.

6. A boat in accordance with claim 5 wherein the forward portion thereof is provided with a pair of deck panels, each said deck panel having a foamed synthetic resinous core and more dense cover sheets adhered to each side surface of said core, the outer surfaces of said deck panels being integrally secured to said closure members and attached to each other along a line lying in the plane of the keel of said boat with a water-tight joint thereby forming a solid and continuous forward upper deck.

7. A boat in accordance with claim 5 wherein the forward and rearward portions thereof are provided with a pair of forward deck panels and a pair of rearward deck panels, each said deck panel having a low density foamed synthetic resinous core and more dense cover sheets adhered to each side surface of said core, the outer surfaces of the forward pair of said deck panels being integrally attached to said closure members and to each other along a line of juncture lying in the plane of said keel, and said rear deck panels being integrally secured to said closure members at the rearward portion of said boat and being secured to each other along a line lying in the plane of the keel of said boat, said forward and rear deck panels defining a cockpit therebetween.

8. In a boat constructed from a pair of full length bottom panels secured along their inner edges to each other, a pair of full length side panels secured to the other edge surfaces of said bottom panels and a rear panel secured to the rearward ends of said bottom and side panels, each said panel having a low density synthetic resinous core and more dense cover sheets adhered to each side surface thereof, the joint between the inner surfaces of said bottom panels comprising in each said panel longitudinally disposed reinforcing members positioned adjacent to each of the cover sheets of said panel and to the line of juncture between said panels, each said reinforcing member being adhesively secured to said cover sheet and to the portion of the core surrounding the same, and a spline positioned in the median portion of said core bridging said line of juncture and extending for a distance into the core of each said panel from said line of juncture, said spline being adhesively secured to the core which surrounds it, extending substantially the full length of said joint and having a width dimension in the range of one-half to twice the thickness dimension of said panels, a keel overlying the external longitudinal line of juncture of said panels adhesively secured to the cover sheets thereof and mechanically secured to the reinforcing members adjacent thereto, and an inner cover plate overlying the internal longitudinal line of juncture of said panels adhesively secured to the inner surfaces of said cover sheets and mechanically secured to the reinforcing members adjacent thereto.

9. In a boat constructed from a pair of full length bottom panels secured along their inner edges to each other, a pair of full length side panels secured to the other edge surfaces of said bottom panels and a rear panel secured to the rearward ends of said bottom and side panels, each said panel having a low density synthetic resinous core and more dense cover sheets adhered to each side surface thereof, the joint between the inner surfaces of said bottom panels and the joint between the other edge surfaces of said bottom panels and the mating edge surface of said side panels each comprising in each said panel forming said joint longitudinally disposed reinforcing members positioned adjacent to the cover sheets and to the line of juncture between said panels and adhesively secured to said cover sheets and to the portion of the core surrounding the same, splines positioned in the median portion of the core bridging each said line of juncture and extending for a distance into each said panel from said line of juncture, each said spline being adhesively secured to the core which surrounds it and extending substantially for the full length of said joint, a keel overlying the external longitudinal line of juncture of said bottom panels adhesively secured to the cover sheets thereof and mechanically secured to the reinforcing members adjacent thereto, an inner cover plate overlying the internal longitudinal line of juncture of said bottom panels adhesively secured to the inner surfaces of the cover sheets thereof and mechanically secured to the reinforcing members adjacent thereto, a chine member overlying the external longitudinal line of juncture of the said side panel and said bottom panel adhesively secured to the cover sheets of said side and bottom panels respectively and mechanically secured to the reinforcing members adjacent to said external cover sheets, and an inner cover plate overlying the internal longitudinal line of juncture of said side and bottom panels and adhesively secured to the inner surfaces of the cover sheets of said panels and mechanically secured to the reinforcing members disposed adjacent to said cover sheets and the line of juncture therebetween.

10. A boat construction in accordance with claim 9 wherein the width dimension of said splines is in the range of one-half to twice the thickness dimension of said panels joined thereby.

11. A curved sandwich panel having a low density foamed resinous core portion, a more dense cover sheet adhered to one side surface of said core and the opposite surface of said core having an irregular configuration comprising a plurality of ledges arranged in cascade fashion from each side edge of said panel toward the central portion thereof, said ledges being angularly inclined and disposed at angles varying in increments gradually from perpendicular toward horizontal, and each said ledge being provided with a longitudinally extending reinforcing member adhered to the surface of said core forming said ledge.

12. A structure comprising a metallic support member and a reinforcing insert, said insert having a low density resinous core portion, one side surface of said core portion having a smooth surface of gradually curving contour and having adhered thereto a rigid dense cover sheet, the opposite surface of said core having a plurality of ledges arranged in cascade fashion from each side surface of said panel toward the central portion thereof, said ledges being angularly inclined and disposed at angles incrementally varying gradually from perpendicular toward horizontal, the inner surface of said support having ledges corresponding to the said ledges on said insert and said insert being adhesively secured to the inner surface of said support member, and said insert being provided with rigid, dense reinforcing members extending the full length of the said ledges on said insert and adhesively secured thereto.

References Cited in the file of this patent

UNITED STATES PATENTS

| | | |
|---|---|---|
| 1,340,441 | Gardner | May 18, 1920 |
| 2,183,017 | Grant | Dec. 12, 1939 |
| 2,361,438 | Turner | Oct. 31, 1944 |
| 2,376,653 | Boyer | May 22, 1945 |
| 2,639,252 | Simon et al. | May 19, 1953 |
| 2,744,042 | Pace | May 1, 1956 |
| 2,816,298 | Foster | Dec. 17, 1957 |
| 2,833,682 | Delaszlo | May 6, 1958 |
| 2,863,797 | Meyer | Dec. 9, 1958 |
| 2,866,985 | Blackmore | Jan. 6, 1959 |
| 2,875,117 | Potchen | Feb. 24, 1959 |
| 2,875,720 | Hupp | Mar. 3, 1959 |
| 2,909,791 | Malary | Oct. 27, 1959 |
| 2,941,216 | Carlson | June 21, 1960 |

FOREIGN PATENTS

| | | |
|---|---|---|
| 328,458 | Great Britain | May 1, 1930 |

OTHER REFERENCES

A.P.C. application of Dornier, Ser. No. 212,074, published May 11, 1943 (abandoned).